United States Patent
Tokita et al.

[15] 3,657,058
[45] Apr. 18, 1972

[54] INTEGRAL VIBRATION DAMPING STRUCTURE FOR INDUCING SIGNIFICANT SHEAR DEFORMATION

[72] Inventors: Noboru Tokita, Wayne, N.J.; Edwin R. Hahn, Grosse Pointe, Mich.

[73] Assignee: Uniroyal, Inc., New York, N.Y.

[22] Filed: June 19, 1970

[21] Appl. No.: 47,779

[52] U.S. Cl. ............ 161/37, 161/145, 161/165, 161/166, 161/172, 161/217, 161/114, 181/33
[51] Int. Cl. ............................................ B32b 3/14
[58] Field of Search ............................ 161/36–37, 165, 161/177, 178, 181, 217–218, 145, 166, 172, 114; 181/33 R, 33.1

[56] References Cited

UNITED STATES PATENTS

| | | | |
|---|---|---|---|
| 1,975,918 | 10/1934 | Berg | 161/145 X |
| 3,087,569 | 4/1963 | Kurtze | 161/166 X |
| 3,424,270 | 1/1969 | Hartman et al. | 181/33 |
| 3,056,707 | 10/1962 | Helbing et al. | 181/33.1 |
| 3,247,928 | 4/1966 | Poncet | 181/33 |
| 3,562,089 | 2/1971 | Warnaka et al. | 161/217 X |
| 3,071,217 | 1/1963 | Gould | 161/218 X |

FOREIGN PATENTS OR APPLICATIONS 664,864   6/1963   Canada.............................161/145

*Primary Examiner*—Philip Dier
*Attorney*—Jack Posin

[57] ABSTRACT

An integral vibration damping structure, comprising a thin layer of damping material interposed between and adhered to a pair of overlapping, elongated rigid members, the layer of damping material being disposed at an angle other than about 90° to the direction of propagation of the vibration to be damped and being deformed in shear when subjected to such vibration, thereby substantially reducing such vibration.

The foregoing abstract is neither intended to define the invention disclosed in this specification, nor is it intended to be limiting as to the scope of the invention in any way.

15 Claims, 8 Drawing Figures

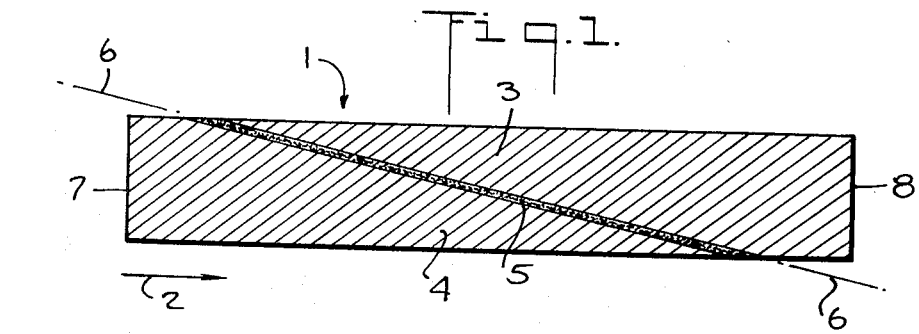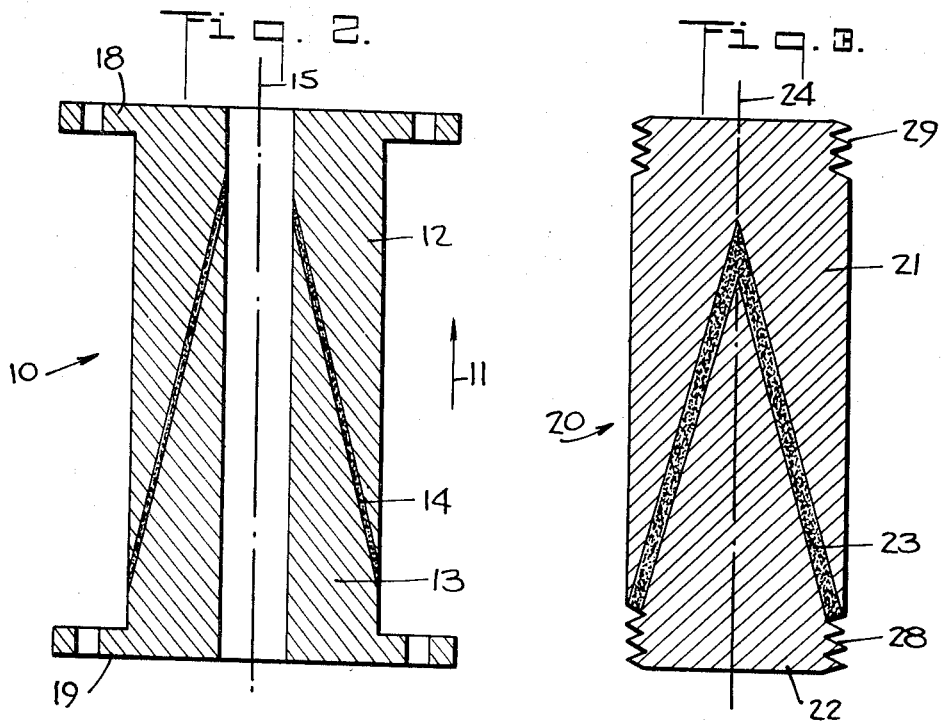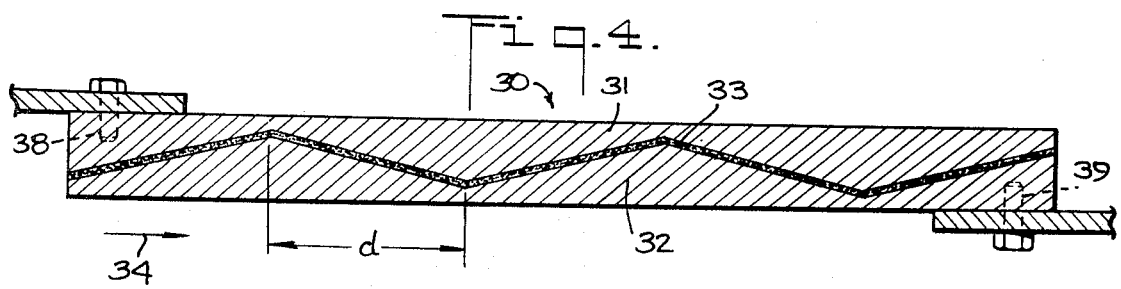

PATENTED APR 18 1972 3,657,058

INVENTORS
NOBORU TOKITA
EDWIN R. HAHN
BY Jack Rosin
ATTORNEY

AN INTEGRAL VIBRATION DAMPING STRUCTURE FOR INDUCING SIGNIFICANT SHEAR DEFORMATION

BACKGROUND OF THE INVENTION

This invention relates to vibration damping structures, and, more particularly, to such structures in which a thin layer of damping material is interposed between and adhered to adjacent rigid members to form a composite integral structure.

Rigid structural members, for example metal, readily transmit vibrations in all directions and at all frequencies. Two major forms of vibrations which have been recognized are longitudinal vibrations, which propagate through a member in a series of waves of compression and expansion, and transverse vibrations, which are transmitted through the member as a series of flexural waves. Longitudinal and transverse vibrations may appear, for example, in shafts, compression or tension support members, strings, organ pipes, water pipes and even in the earth, etc.

In conventional vibration damping structures high hysteresis materials (also referred to herein as "damping" materials), for example asphalt, rubber and rubber-like materials and/or blends of such materials, have heretofore been interposed between adjacent rigid members in planes disposed both parallel to and normal to the direction of propagation of longitudinal vibration in such members. While these arrangements have achieved varying degrees of damping of such vibration, they have relied primarily on compression and expansion of the damping material to achieve the same. It has bee determined, in accordance with the present invention, that the use of a thin layer of damping material, disposed between and adhered to overlapping, adjacent rigid members at an angle other than about 90° to the direction of propagation of the longitudinal vibration, causes shear deformation forces to occur in the damping material, which forces result in significantly improved damping of such vibration.

It is, therefore, a primary object of the present invention to provide an improved vibration damping structure.

A further object of this invention is to provide improved vibration damping structures employing a variety of basic structural shapes in damping longitudinal vibrations.

Another object of this invention is to provide a variety of vibration damping structures having damping material therein which is subjected to shear deformation resulting from longitudinal vibration.

Further objects or advantages of this invention will become apparent as the following description proceeds.

SUMMARY OF THE INVENTION

Briefly stated, and in accordance with one embodiment of this invention, there is provided an integral vibration damping structure which is comprised of a thin layer of damping material and a pair of rigid members. The damping material is interposed between and adhered to the rigid members and is oriented at an angle other than about 90° with respect to the direction of propagation of the longitudinal vibration that is to be damped. The cross-sectional area of one of the rigid members progressively decreases and the cross-sectional area of the other of the rigid members progressively increases in planes normal to a common longitudinal portion of the structure in which the members are separated by the damping material. The variation of cross-sectional areas in the rigid members causes the amplitude of an induced longitudinal vibration or impulse moving through the common longitudinal portion of the structure to vary in a different manner in each rigid member. This difference in the amplitudes of the longitudinal vibration gives rise to the formation of shear deformation forces in the interposed, adhered layer of damping material, which forces tend to damp out the longitudinal vibration. In addition the velocities of the longitudinal vibration moving through the two rigid members become different due to the constraint on the wave imposed by the damping material. This difference in velocity also gives rise to the formation of vibration damping, shear deformation forces in the layer of damping material. Preferably, the thickness of the layer of damping material is such that it substantially prevents relative movement other than vibrational relative movement between the two rigid members.

BRIEF DESCRIPTION OF THE DRAWINGS

While the specification concludes with claims particularly pointing out and distinctly claiming the subject matter of this invention, it is believed that the invention will be better understood from the following description, taken in conjunction with the accompanying drawings, in which:

FIG. 1 is a sectional elevation view of one embodiment of this invention;

FIG. 2 is a sectional elevation view of another embodiment of this invention;

FIG. 3 is a sectional elevation view of a further embodiment of this invention;

FIG. 4 is a sectional elevation view of yet another embodiment of this invention;

DESCRIPTION OF THE PREFERRED EMBODIMENTS

Figure 5:
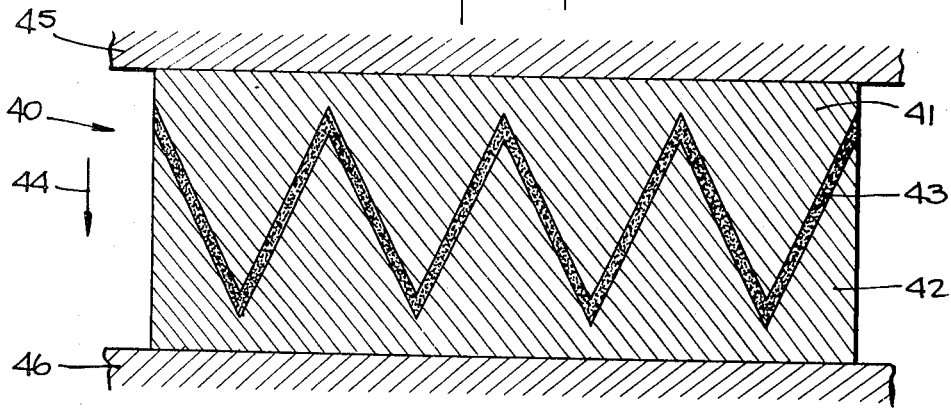
FIG. 5 is a sectional elevation view of a still further embodiment of this invention.

Referring to FIG. 1, a vibration damping structure in accordance with this invention has been illustrated in the form of an integral rectangular prism or bar, shown generally at 1. The general direction or axis of propagation of a longitudinal vibrational wave that is to be damped as it passes through the bar 1 is shown by a direction arrow 2. The bar 1 comprises upper and lower, wedge-shaped, rigid members 3 and 4, respectively, separated by a thin layer of damping material 5. The damping material 5, for example butyl rubber, is sandwiched between and adhered to the rigid members 3 and 4 along a plane 6 which is generally diagonal of the rectangular bar 1 and intersects at an acute angle the axis 2 of propagation of the longitudinal vibrational wave.

In order to achieve a significant degree of shear deformation damping in accordance with this invention the following features should be utilized in a vibration damping structure, either individually, or in combination with one another for maximum benefits: the angle which the layer of damping material 5 makes with the direction 2 of propagation of the longitudinal wave is preferably selected so that the length of the structure 1 spanned by the angularly disposed layer of damping material 5 is at least substantially as great as but not more than twice as great as the wavelength of the primary longitudinal vibration to be damped; the layer of damping material 5 is preferably adhered directly to the adjacent surfaces of the rigid members 3 and 4 by being vulcanized or by being cemented thereto; the layer of damping material 5 is preferably thin enough to substantially prevent relative movement other than vibrational relative movement between the rigid members 3 and 4 and is preferably in the range of from about one thirty-second inch to one-eighth inch; and, the sum of the cross-sectional areas of the rigid members 3 and 4 is in the range of from about four times to about 32 times (and is preferably about 16 times) as great as the cross-sectional area of the layer of damping material 5 in substantially all cross-sectional planes passing through the structure 1 normal to the direction of propagation of the longitudinal vibrational wave. When a longitudinal vibration or an impulse is induced at the left end 7 of bar 1, it has a much higher amplitude in the lower wedge-shaped member 4 of the bar than it does in the upper wedge-shaped member 3 as it traverses the left hand portion of the bar, for reasons which will be explained below. As the wave traverses the bar toward the right end 8 of the bar, the amplitude of the wave in the lower member 4 of the bar increases, and the amplitude of the wave in the upper member 3 of the bar decreases. The relationship of the respective amplitudes in the rigid members may be substantiated by the principle of conservation of energy. Also, the velocities of propagation of the longitudinal vibration through the two rigid members 3 and 4 would be equal in the absence of an interposed, adhered layer of damping material. However, since the rigid members 3 and 4 are joined by the layer of damping material 5, the velocities of propagation of the wave are different in the two rigid members. As the wave traverses the bar from the left end 7 toward the right end 8 of the bar, the velocity of propagation in the lower rigid member 4 decreases at a faster rate than does the velocity of propagation of the wave in the upper rigid member 3. As a result, any longitudinal vibrational wave induced at the left end 7 of the bar causes different states of compression to exist in the upper and lower members of the bar at any given distance from the left end. Stated another way, the upper and lower portions of a longitudinal vibrational wave which passes through the respective upper and lower members 3 and 4 of the bar will be out of phase with each other and the amplitudes of the waves will be different from each other. As a result, the damping material interposed between the upper and lower members 3 and 4 will be deformed in shear as the wave propagates through the bar, causing much of the vibrational energy to be absorbed by the damping material and permitting relatively little of the vibrational energy to be transmitted to the right end 8 of the bar.

The wave equation for the longitudinal mode of vibration along a wedge-shaped rigid member may be expressed by the relationship $$\delta(1-2x)\frac{\partial^2 \epsilon}{2t^2} = E\left[-\alpha\frac{\partial \epsilon}{2x} + (1-\alpha x)\frac{\partial^2 \epsilon}{2x^2}\right] \quad (1)$$

wherein
- $\rho$ is the density of the material of the rigid member;
- $E$ is the modulus of elasticity of the material of the rigid member;
- $\alpha$ is the included angle between the wedge-forming surfaces of the rigid member (hereinafter also referred to as "taper angle");
- $\epsilon$ is amplitude of the wave;
- $t$ represents time; and,
- $x$ is the direction of wave propagation in the rigid member.

If the taper angle, $\alpha$, is relatively small, the spatial component of the amplitude of the wave, $\epsilon(x)$, of equation (1) may be expressed as a function of $x$ and $\alpha$, as follows:

$$\epsilon(x) = \epsilon o(1 + k\alpha)f(x) \quad (2)$$

wherein
- $\epsilon o$ is the amplitude of the wave in a non-wedge shaped, flat bar; and,
- $k$ is a numerical constant.

The value $k\alpha$ is positive with respect to the propagation of a longitudinal wave through a wedge-shaped rigid member from the end thereof having the larger cross-sectional area to the end thereof having the smaller cross-sectional area. Accordingly, the amplitude of such a longitudinal wave increases as it moves through such a rigid member. On the other hand, the value $k\alpha$ is negative with respect to the propagation of a longitudinal wave through a wedge-shaped rigid member from the end thereof having the smaller cross-sectional area to the end thereof having the large cross-sectional area. Accordingly, the amplitude of such a longitudinal wave decreases as it moves through such a rigid member.

When two wedge-shaped rigid members are adhered to one another by a thin layer of damping material in the manner shown in FIG. 1, the accoustical energies stored in the respective rigid members are essentially isolated from one another due to the fact that the damping material has a considerably different value of accoustic impedance from that of the rigid members. As a result of this the relative displacement of damping material between the rigid members may be expressed by the relationship $$\Delta \epsilon = 2\epsilon o(k\alpha)f(x) \quad (3)$$

This relative displacement results in shear deformation of the damping material.

The velocity V of a longitudinal vibrational wave through the upper and lower rigid members 3 and 4 of bar 1 may be determined by the relationship $$V = Vo[1 - f(\eta, \sigma, \theta)]$$

wherein,
- $Vo$ is the longitudinal velocity of the wave in the material of which the respective rigid member 3 or 4 under consideration is made;
- $\eta$ is the loss factor, i.e., the ratio of the viscous modulus to the elastic modulus of the damping material 5;
- $\sigma$ is the ratio of the cross-sectional area of the damping material 5 to the cross-sectional area of the respective rigid member 3 or 4, normal to the direction 2 of propagation of the longitudinal vibrational wave, at the point under consideration; and
- $\theta$ is the ratio of the density of the damping material 5 to the density of the material of the respective rigid member 3 or 4.

It can be seen that in a variety of constructions fashioned out of given rigid members and damping material the ratios of the cross-sectional area of the damping material to the cross-sectional areas of the rigid members, normal to the direction of propagation of the longitudinal wave, which ratios are hereinafter referred to as "cross-sectional area ratios," become the controlling variables affecting the propagational velocity of the wave through the structure.

Considering the propagating velocity in the upper and lower members 3 and 4, respectively, of the composite bar 1 shown in FIG. 1, when the left hand side 7 of the bar is struck, a longitudinal vibrational wave is generated therein which moves in the direction 2. Since the cross-sectional area ratio of the lower member 4 is smaller than the cross-sectional area ratio of the upper member 3 in the left hand part 7 of the bar, the propagating velocity of the longitudinal wave in the left hand portion 7 of the lower member 4 is faster than the propagating velocity of the longitudinal wave in the left hand portion 7 of the upper member 3 of the bar. The wave velocity in the lower member 4 of the bar decreases at a faster rate than the wave velocity in the upper member 3 as the wave moves through the bar 1 from left to right. At the right end portion 8 of the bar, the wave velocity in the upper member 3 is greater than the wave velocity in the lower member 4. The resultant phase difference, in addition to inducing shear deformation in the damping material 5, inhibits the formation in bar 1 of standing waves and their attendant longitudinal resonance.

Experimental data on the damping properties of the composite bar of FIG. 1 ("Diagonal Damping Layer Bar") on longitudinal and transverse vibrations are shown in TABLE I below. These are compared with the data for a composite bar similar to that of FIG. 1 but in which the layer of damping material is aligned parallel to the direction 2 of propagation of the longitudinal vibrational wave ("Parallel Damping Layer Bar"), the weight and physical properties of the damping material being the same in each case.

TABLE I

| Sample | Longitudinal Vibration Frequency | Percentage of applied energy absorbed by structure |
|---|---|---|
| Diagonal damping layer bar | 2,000 | >20.0 |
| Parallel damping layer bar | 2,000 | 0.1 |
| | Transverse vibration | |
| Diagonal damping layer bar | 1,000 | >20.0 |
| Parallel damping layer bar | 1,000 | 0.05 |

A tubular embodiment of a vibration damping structure in accordance with this invention has been illustrated in FIG. 2. The tubular vibration damping structure, shown generally at 10, is provided with flanges 18 and 19 by which it may be installed in a pipeline to absorb longitudinal vibrations travelling through the pipeline in the direction shown by the arrow 11. The structure 10 comprises outer and inner rigid tubular members 12 and 13, respectively, and a thin layer of damping material 14 in the form of a hollow truncated cone. The layer of damping material 14 is positioned between and adhered to the outer and inner members 12 and 13 of the tubular structure 10. The layer of damping material 14 extends from its major diameter, which is coincident with the outer diameter of the outer member 12, to its minor diameter, which is coincident with the inner diameter of inner member 13, the outer and inner members 12 and 13 and the hollow truncated cone formed by the layer of damping material 14 being coaxial relative to axis 15. The tubular vibration damping structure 10 of FIG. 2 operates to damp longitudinal vibrational waves in the same manner as does the bar-shaped vibration damping structure 1 of FIG. 1, for reasons similar to those set forth hereinbefore in connection with the description of the FIG. 1 bar-shaped vibration damping structure embodiment.

A solid, cylindrical, rod-like embodiment of a vibration damping structure in accordance with this invention has been illustrated generally at 20 in FIG. 3. In this case the structure 20 includes outer and inner rigid members 21 and 22, respectively, which are separated from each other by a thin layer of damping material 23. The structure 20 is threaded at its ends 28 and 29 to facilitate its coupling to other structures, between which it is desired to limit the transmission of longitudinal vibration. The layer of damping material 23 is in the form of a hollow cone and is positioned between and adhered to complementary conical portions of the outer and inner members 21 and 22, the conical portions of the inner and outer members and of the damping material coaxial with respect to the axis 24 of the structure 20.

An elongated beam or column embodiment of a vibration damping structure in accordance with this invention has been illustrated generally at 30 in FIG. 4. In this embodiment the structure 30 includes upper and lower rigid members 31 and 32, respectively, which are separated by a thin layer of damping material 33. The structure 30 is provided with threaded apertures 38 and 39 at its ends to facilitate its coupling to other structures, between which it is desired to limit the transmission of longitudinal vibration. The layer of damping material 33 is arranged in the form of a zig-zag plane which is positioned between and adhered to complementary zig-zag surfaces of the upper and lower members 31 and 32. The general direction or axis of propagation of a longitudinal wave that is to be damped as it passes through the bar 30 is shown by direction arrow 34.

Three factors are especially significant with respect to the degree of damping achieved in this embodiment and, in varying degree, to the other embodiments disclosed herein. The first factor is the angle that the layer at damping material is disposed of with respect to the direction of propagation of the wave. The difference between the amplitudes, in the respective rigid members, is proportional to the degree of this angle. However, a critical angle exists which produce the maximum transmission of shear deformation in the damping material. This critical angle is a function of the ratio of elastic moduli of the respective rigid members to that of the damping material. The second factor is that the ratio of the maximum cross-sectional area of each rigid member 31 and 32 to the minimum cross-sectional area of the other member should be large because this introduces larger phase differences in wave velocities between the upper and lower members and greater shear deformation damping of longitudinal vibrational waves therein. The third factor is that the distance d between points of maximum and minumum cross-sectional area in a common longitudinal portion of each rigid member should be greater than one wave length but less than two wave lengths of the primary longitudinal vibrational wave under consideration in order to minimize in-phase vibration of high frequency longitudinal waves.

A solid, rectangular, block-like embodiment of a vibration damping structure in accordance with this invention has been illustrated generally at 40 in FIG. 5. In this case the structure 40 includes upper and lower rigid members 41 and 42, respectively, which are separated by a thin layer of damping material 43. The layer of damping material 43 is arranged in the form of a zig-zag plane which is positioned between and adhered to complementary zig-zag surfaces of the upper and lower members 41 and 42. The structure 40 is interposed between a vibrating member 45 and the corresponding base or floor 46 which is to be isolated therefrom. The general direction or axis of propagation of a longitudinal wave that is to be damped as its passes through the block 40 is shown by direction arrow 44.

Figure 6:
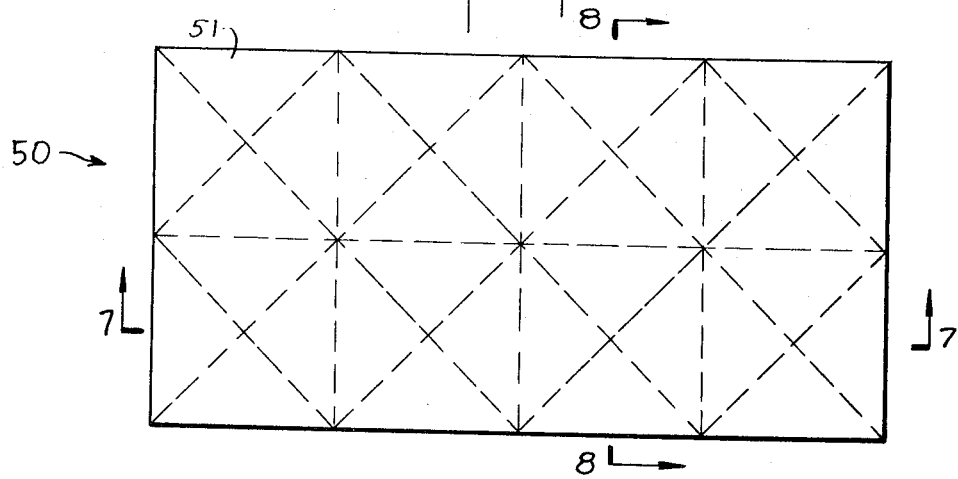
FIG. 6 is a plan view of yet another embodiment of this invention.
Figure 7:
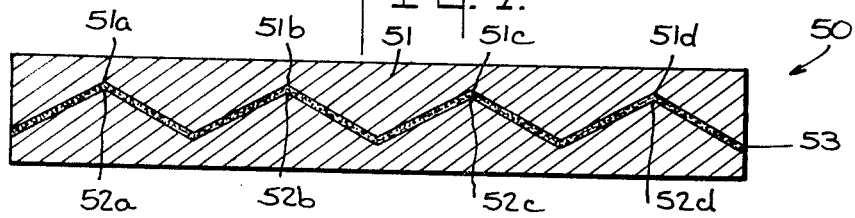
FIG. 7 is a sectional elevation view taken along the line 7—7 of FIG. 6.
Figure 8:
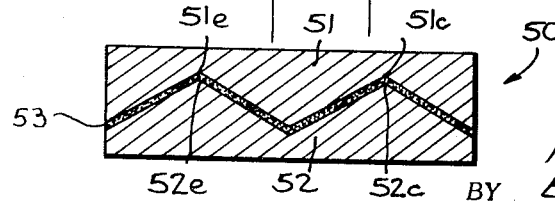
FIG. 8 is a sectional elevation view taken long the line 8—8 of FIG. 6.

Referring now to FIGS. 6–8, an embodiment of the invention has been illustrated in which the vibration damping structure is in the form of a panel, shown generally at 50. In this embodiment the width and length dimensions of the structure are roughly of the same order of magnitude, and both of such dimensions are considerably larger than the thickness dimension of the structure. The structure 50 comprises upper and lower rigid members 51 and 52, respectively, which are separated by a thin layer of damping material 53. The inner surfaces of members 51 and 52 are complementary to each other. The inner surface of lower member 52 comprises a plurality of contiguous, rectangular-based, pyramidical protrusions, the apexes of some of which protrusions are shown at 52a–52b[. The inner surface of upper member 51 comprises a plurality of contiguous, rectangular-based, pyramidical recesses, the apexes of some of which recesses are shown at 51a–51b[. The pyramidical recesses on the inner surface of upper member 51 corresponds to and match the pyramidical protrusions on the inner surface of lower member 52, and the two inner surfaces are separated by the layer of damping material, which is adhered to both surfaces.

It will be apparent from the foregoing description that this invention provides for a variety of improved vibration damping structures. In these structures first and second rigid members and a thin layer of damping material are so constructed and arranged that, upon application of longitudinal vibration to the structure, shear deformation forces are generated in the damping material to effectively dampen the vibration. The various vibration damping structures discussed are reliable, durable and economical, and when interposed between a source of longitudinal vibrational energy and a structure to be isolated from such energy, effectively absorb significant amounts of such energy.

While particular embodiments of this invention have been shown and described, it will be obvious to those skilled in the art that various other changes and modifications may be made without departing from this invention in its broader aspects, and it is, therefore, aimed in the appended claims to cover all such changes and modifications as fall within the true spirit and scope of this invention.

Having thus described the invention, what is claimed as new and desired to be protected by Letters Patent of the United States is:

1. A vibration damping structure, comprising first and second rigid members overlapping one another throughout at least a common longitudinal portion of said structure, and a layer of damping material interposed between and adhered to each of said rigid members throughout said common portion of said structure, the cross-sectional area of said first rigid member in substantially all planes normal to the longitudinal direction of said common portion of said structure progressively increasing throughout said common portion from a minimum value at one end of said common portion of said structure to a maximum value at the other end thereof and the cross-sectional area of said second rigid member in substantially all planes normal to the longitudinal direction of said common portion of said structure progressively decreasing throughout said common portion from a maximum value at said one end of said common portion of said structure to a minimum value at said other end thereof, the thickness of said layer of damping material being such that it substantially prevents relative movement other than vibrational relative movement between said first and second rigid members.

2. A vibration damping structure as described in claim 1, the length of said common portion of said structure being at least substantially as great as but not more than twice as great as, the wavelength of the primary vibration to be damped by said structure.

3. A vibration damping structure as described in claim 1, the sum of the cross-sectional areas of said rigid members in substantially all planes normal to the longitudinal direction of said common portion of said structure being in the range of from about four times to about 32 times as great as the cross-sectional area of said layer of damping material in substantially all planes normal to the longitudinal direction of said common portion of said structure.

4. A vibration damping structure as described in claim 3, the sum of the cross-sectional areas of said rigid members in substantially all planes normal to the longitudinal direction of said common portion of said structure being preferably about 16 times as great as the cross-sectional area of said layer of damping material in substantially all planes normal to the longitudinal direction of said common portion of said structure.

5. A vibration damping structure as described in claim 2, said layer of damping material having a thickness of at least about one thirty-second of an inch, but not greater than about one-eighth of an inch.

6. A vibration damping structure as described in claim 1, the ratio of the cross-sectional area of said layer of damping material in all planes normal to the longitudinal direction of said common portion of said structure to the cross-sectional area of said first rigid member in all planes normal to the longitudinal direction of said common portion of said structure progressively decreasing throughout said common portion of said structure and the ratio of the cross-sectional area of said layer of damping material in all planes normal to the longitudinal direction of said common portion of said structure to the cross-section area of said second rigid member in all planes normal to the longitudinal direction of said common portion of said structure progressively increasing throughout said common portion of said structure, such that the velocity of propogation of said longitudinal wave decreases at a faster rate in said second rigid member than it does in said first rigid member as said longitudinal wave traverses said common portion of said structure.

7. A vibration damping structure as described in claim 5, said common portion of said structure being in the form of a rectangular prism, said layer of damping material being substantially along a diagonal plane of said prism.

8. A vibration damping structure as described in claim 5, said common portion of each structure being in the form of a tube, said layer of damping material being in the form of a hollow truncated cone having its axis coincident with the axis of said tube.

9. A vibration damping structure as described in claim 5, said common portion of said structure being in the form of a cylindrical rod, said layer of damping material being in the form of a hollow cone having its axis coincident with the axis of said cylindrical rod.

10. A vibration damping structure as described in claim 5, comprising said first and second rigid members overlapping one another throughout at least a second common longitudinal portion of said structure contiguous to said first mentioned common portion of said structure, said layer of damping material interposed between and adhered to each of said rigid members throughout said second common portion of said structure, the cross-sectional area of said first rigid member in substantially all planes normal to the longitudinal direction of said second common portion of said structure progressively decreasing throughout said second common portion of said structure from said maximum value at said other end of said first mentioned common portion of said structure to said minimum value at the end of said second common portion of said structure remote from the other end of said first mentioned common portion of said structure, the cross-sectional area of said second rigid member in substantially all planes normal to the longitudinal direction of said second common portion of said structure progressively increasing throughout said second common portion of said structure from said minimum value at said other end of said first mentioned common portion of said structure to said maximum value at said end of said second common portion of said structure remote from said other end of said first mentioned common portion of said structure, the length of said common portion of said structure being at least substantially as great as but not more than twice as great as, the wavelength of the primary longitudinal vibration to be damped by said structure.

11. A vibration damping structure as described in claim 10, said first and second common portions of said structure, together, being in the form of an elongated rectangular bar whose width and thickness dimensions are substantially the same.

12. A vibration damping structure as described in claim 10, said first and second common portions of said structure, together, being in the form of a rectangular block whose width and length dimensions are substantially the same.

13. A vibration damping structure as described in claim 10, said first and second common portions of said structure, together, being in the form of a panel, the length and width of said panel being substantially greater than the thickness of said panel, said first rigid member having a surface thereon provided with at least one protrusion extending toward said second rigid member, said second rigid member having a surface thereon provided with a corresponding recess therein which receives said protrusion.

14. A vibration damping structure as described in claim 13, said surface of said first rigid member being provided with a plurality of protrusions extending toward said second rigid member, said surface of said second rigid member being provided with a plurality of corresponding recesses therein which receive said protrusions.

15. A vibration damping structure as described in claim 14, said protrusions and recesses being in the form of pyramids having rectangular bases.

* * * * *